United States Patent [19]

Nossal

[11] Patent Number: 4,776,796
[45] Date of Patent: Oct. 11, 1988

[54] PERSONALIZED HAIRSTYLE DISPLAY AND SELECTION SYSTEM AND METHOD

[76] Inventor: Lisa M. Nossal, 9 Hickory Dr., Medfield, Mass. 02052

[21] Appl. No.: 125,246

[22] Filed: Nov. 25, 1987

[51] Int. Cl.$^4$ .............................................. G09B 19/00
[52] U.S. Cl. ...................................................... 434/94
[58] Field of Search ........................... 434/94, 371, 377

[56] References Cited

U.S. PATENT DOCUMENTS

| | | | |
|---|---|---|---|
| 2,071,338 | 2/1937 | Henze et al. | 434/94 |
| 2,309,390 | 1/1943 | Grossguth et al. | 434/94 |
| 2,921,387 | 1/1960 | Reeves | 434/94 |
| 3,120,066 | 2/1964 | Reeves | 434/94 |
| 3,325,917 | 6/1967 | Kinnaman | 434/94 |
| 4,297,724 | 10/1981 | Masuda et al. | 434/94 X |

*Primary Examiner*—William H. Grieb
*Attorney, Agent, or Firm*—Donald W. Meeker

[57] ABSTRACT

A selection of photographic images of hairstyles are each secured on three edges to a viewing sheet. A see-through viewing space in any one of a number of common facial shapes is provided on the image where the face should appear. An instant photographic image of a user is inserted under the fourth side of one of the hairstyle image to view what the user would look like with the hairstyle. A tinted transparent sheet is inserted in three corner holders positioning the tinted sheet over the hairstyle image to change the apparent color or tint of the hairstyle image. A scaled facial outline viewing guide having a common facial shape is provided in the camera viewfinder to outline the user's face in the field of view when taking a picture of the user. Additional information such as appropriate hairstyling products may be printed on each viewing sheet. A series of viewing sheets are removably bound into a book form for ease of use and storage.

14 Claims, 1 Drawing Sheet

PERSONALIZED HAIRSTYLE DISPLAY AND SELECTION SYSTEM AND METHOD

BACKGROUND OF THE INVENTION

1. Technical Field

The present invention relates to educational devices and to article and surface demonstration devices concerned with toiletries, and in particular to a personalized hairstyle display and selection system enabling an individual to insert his or her own picture beneath any of a number of pictures of hairstyles to compare a variety of hairstyles as they would look on the individual.

2. Background Art

Selecting a hairstyle is a personal and very important grooming decision. A hairstyle which looks attractive on one individual may look horrible on another. Therefore the practice of having customers select hairstyles based upon looking at others or pictures of others having a particular hairstyle may turn out to be a disaster because of the individual's facial structure, coloring, features or any of a number of unique physical characteristics. The ideal situation is for the customer actually to be able to picture the hairstyle on him- or her-self before having the hairdresser create the hairstyle on the customer.

Prior art systems for visualizing make-up or hairstyles on indivduals involve very expensive and elaborate equipment including videos and computers to transpose an image of a hairstyle onto an image of a customer. At least one worker is required to operate the elaborate prior art systems, sometimes requiring the worker to have artistic talent in creating the image of the customer with a proposed hairstyle. For each hair-style to be viewed the technically detailed and time-consuming task of electronically transposing one image on the other. To produce each image requires several minutes. And each image costs the customer a substantial sum of money. Usually the number of images is limited because of the time factor involved as well as the expense.

Video imaging systems all have a visual acuity problem because of the nature of the image comprised of a number of dots flashing across the screen. The quality of the image is somewaht blurry at best even with an expert technician. More often the problem is compounded because of nonexpert operators producing very blurry video images and unnatural color, particularly in the flesh tones and hair colors, the two most crucial factors in making a hairstyle selection.

The prior art video hairstyle selection systems are out in public display for all in the beauty parlor to see, and often attracting considerable attention while a customer is making a selection. This public showing of a customer with an unflattering hairstyle is very embarrassing to the customer.

Photographs of the video image of the customer with the proposed hairstyle are usually quite fuzzy due to the imperfect nature of the video image which does not lend itself to photographing.

3. Disclosure of Invention

The present invention overcomes the problems involved with the prior art and produces a more effective and desirable solution to the problem of selecting just the right hairstyle for each individual.

By taking a single instant photograph of the customer and allowing the customer to insert his or her photograph in as many frames as the customer desires, each showing a potential hair-style, a simple, inexpensive system allows an individual to select a hairstyle which will look attractive without incurring considerable expense in the selection process. The cost of buying the necessary equipment is a small fraction of what the video-computer systems cost, thereby saving money for the hairdresser and the customer.

By providing a camera with a scaled facial outline viewing guide within which to view the customer through the camera viewfinder, anyone can operate the camera effectively without requiring any special expertise. Each scaled facial outline viewing guide (formed in the outline of one of at least eight common facial shapes) is mounted interchangeably on the camera viewfinder system to allow for a properly scaled image of a variety of common facial shapes. Once the photograph has been taken, the worker can leave the customer alone to view hairstyles as desired.

By allowing the customer to view the hairstyles alone and in privacy, the customer need not be embarrassed by having anyone else see what the customer looks like with a particular style. The customer may look at as many different possible hairstyles as desired without incurring a cost for each one and without occupying the time of a worker in the beauty salon. In addition, each new hairstyle can be viewed in a matter of seconds simply by inserting the instant photograph into a hairstyle frame, thereby allowing the customer to view a substantial number of possible hairstyles in a very short period of time.

Photographically imaging the hairstyle and the customer produces visually sharp pictures which give a much clearer image with accurate flesh tones and hair colors of how the hairstyle will actually look on the customer. If a photograph is taken of the customer with the hairstyle as imaged in the system, the photograph produces a much sharper and more accurate image than taking a photograph of a video image.

The present system further allows for pictures and descriptions of the proper hair styling products to be displayed on the same sheet with each hairstyle to enhance the likelihood of success and satisfaction with the proper care of the hairstyle. The required hair texture, hair treatment and instructions for creating the hairstyle (for the hairdresser) may be printed on the sheet also.

Additional information may be displayed on the same sheet including the history of the hairstyle and the creator of the style. Famous individuals sporting the same style may be added for additional interest.

Tinted transparent overlays may be used with the system for considering various colors or tints of hair in addition to those shown on the hairstyle frames.

The entire viewing system with a wide variety of hairstyles may be combined in a single volume (or different volumes as desired) and stored easily. Easy handling by the customer is also an advantage over bulky and heavy video and compauter equipment requiring special care, handling and storage.

By using a ringed binder or other removable-page systems viewing sheets may be removed and replaced as new hairstyles come in to replace old ones.

BRIEF DESCRIPTION OF THE DRAWINGS

These and other details and advantages of my invention will be described in connection with the accompanying drawings, which are furnished only by way of illustration and not in limitation of the invention, and in which drawings.

BEST MODE FOR CARRYING OUT THE INVENTION

Figure 1:
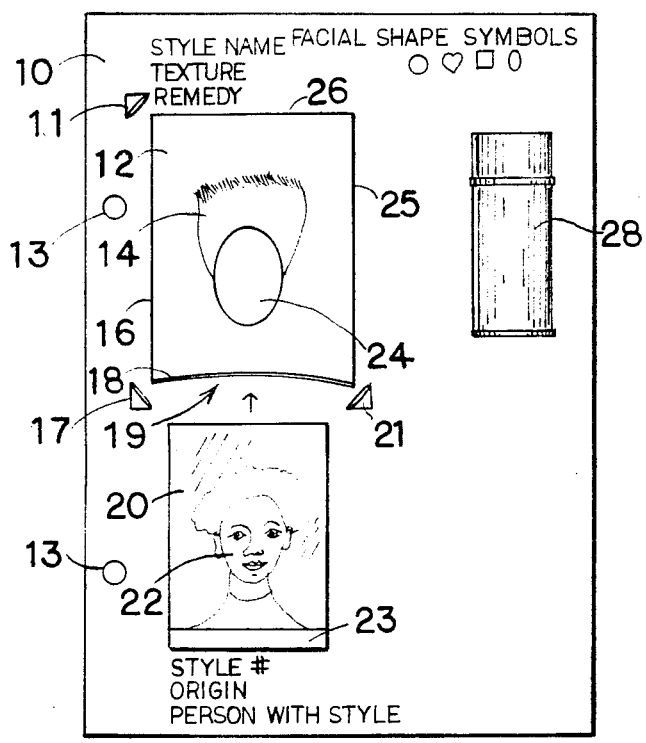
FIG. 1 is a plan view of the viewing sheet showing a photographic image of a user as it would be inserted beneath a photographic image of a hairstyle.

In FIG. 1 the personalized hairstyle display and selection system comprises a viewing sheet 10 having a photographically reproduced image 12 showing a hairstyle 14 and providing a see-through area 24, shaped in a common facial shape, for viewing a photographic image 22 of the face of a user inserted beneath the hairstyle image. The hairstyle image sheet 12 is secured by an adhesive, heat staking or other means to the viewing sheet 10 on three edges 16, 25 and 26, leaving the fourth edge 18 open to form an open slot 19 between the hairstyle image 12 and the viewing sheet 10.

Figure 2:
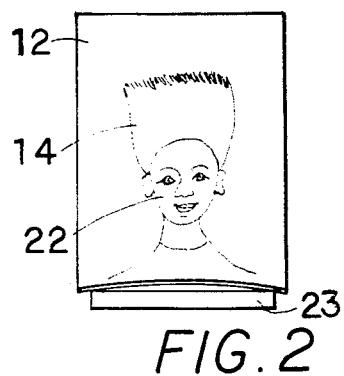
FIG. 2 is a plan view of the photographic image of the hairstyle having the photographic view of a face of a user inserted beneath it with the user's face visible and appearing that the user actually has the hairstyle.

A photographic image 20 showing the face 22 of a user is inserted in the open slot 19 so that the face 22 of the user is viewed beneath the hairstyle image 12 as if the hairstyle 14 were actually on the user, as seen in FIG. 2. The tab 23 or bottom border of the photograph of the user is held to insert the photo and remove it.

Adjacent to the hairstyle image 12 on the viewing sheet an image 28 or images of haircare products are displayed to show the user the appropriate product or products to use in caring for his or her new hairstyle. This serves a useful instructive purpose to insure that the user will care for the hairstyle properly and also provides a means for the maker of the product to advertise and the hair salon owner to make additional sales. Other useful information printed on the viewing sheet includes such things as the name of the hairstyle, the creator or origin of the hairstyle, famous people who wear that hairstyle, the types of hair texture which can take that hairstyle and what a remedy is to prepare each texture for that hairstyle. Instructions for creating the hairstyle may be included for the hairdresser, or the instructions may be included in a separate booklet or on the back of the viewing sheet. The style number on the viewing sheet coincides with the style number in the separate booklet for easy reference.

Figure 3:
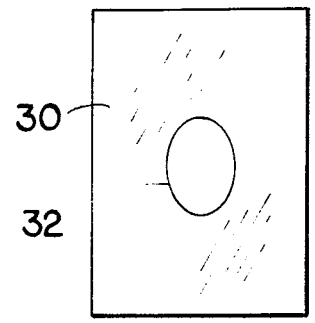
FIG. 3 is a plan view of a tinted transparent sheet for placing over the image of the hairstyle to change the color or tint of the hairstyle while leaving the natural facial colors visible through an opening in the transparent sheet.

In FIG. 3 a tinted transparent sheet 30 may be positioned over the combined image of the user with the new hairstyle to change the color or tint of the hair. An opening 32 in the center of the tinted sheet allows the facial coloring to be viewed as natural. Three corners of the tinted transparent sheet 30 are inserted within the corner holders 11, 17 and 21 (as seen in FIG. 1) adjacent to the two bottom and one upper corner of the hairstyle image to hold the tinted sheet in place so that the image sheet may be transported if desired without dropping the tinted sheet.

Figure 4:
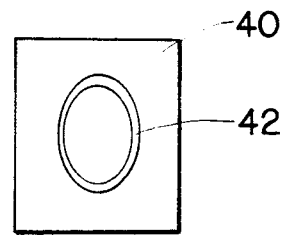
FIG. 4 is a schematic view of a viewing system in a camera having a facial outline guide for assuring the right size image of a user's face to match with any of the hairstyles displayed.

In FIG. 4 the camera viewfinder field 40 is provided with a scaled facial outline viewing guide 42 of a common facial shape to guide the person taking the photo by moving the camera so that the face of the user appears exactly within the facial outline viewing guide 42. This easy-to-use system automatically creates a photographic image of the face of the user which is exactly in proportion to the image of the hairstyle so that the user's image will fit accurately with the hairstyle image. An instant picture camera, such as a Polaroid, is intended to be used for immediate use of the system.

Figure 5:
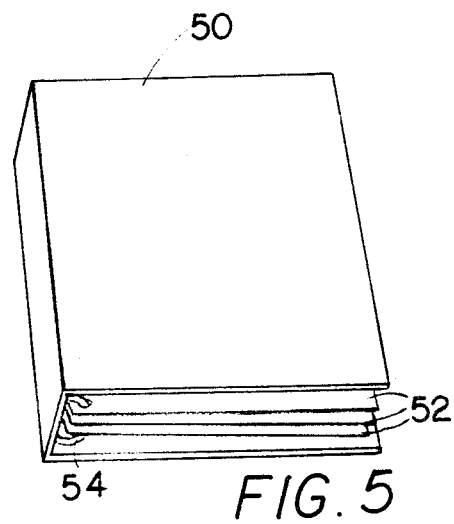
FIG. 5 is a perspective view of a ringed binder book to hold a series of viewing sheets removably.

In FIG. 5 a looseleaf bound book 50 holds a series of viewing sheets 52 held in the book removably by rings 54 through holes 13 in the viewing sheets or by other removable means, thereby allowing the viewing sheets to be changed as new hairstyles are introduced to update the system.

It is understood that the preceding description is given merely by way of illustration and not in limitation of the invention and that various modifications may be made thereto without departing from the spirit of the invention as claimed.

I claim:

1. A hairstyle system for selecting a desired hairstyle which best matches a user's face and for displaying a mutually scaled picture of the user's face and any of a variety of hairstyles, wherein the hairstyle system comprises:

a photographically produced image of a hairstyle printed on a sheet having a clear viewing means of a facial area below the outline of the hairstyle, wherein the sheet is mounted on a flat surface such that an open slot exists between the sheet and the flat surface;

means for photographing a face of a user, having a scaled facial outline viewing guide having a common facial shape in the viewing system of the photographing means for framing the face of a user through the viewing system to produce a photographically produced image of the user scaled to match the framed hairstyle photograph;

a photographically produced image of the face of the user to the same scale as the outline of the hairstyle, wherein the image of the face of the user is inserted in the open slot between the sheet and the flat surface such that the hairstyle appears to be on the head of the user in the picture.

2. The invention of claim 1 wherein a tinted transparent sheet, having an opening corresponding to an area occupied by an image of a facial area of a user, is placed over the image of the hairstyle thereby changing the apparent color of the hairstyle.

3. The invention of claim 2 wherein the viewing sheet further comprises at least three corner holding means for retaining the tinted transparent sheet in place over the image of the hairstyle.

4. The invention of claim 1 further comprising adjacent to the image of the hairstyle on the flat surface at least one image of a hair styling product necessary for creating the pictured hairstyle.

5. The invention of claim 4 further comprising adjacent to the image of the hairstyle on the flat surface instructions relating to the hairstyle.

6. The invention of claim 1 wherein the clear viewing means of seeing a facial area beneath the hairstyle comprises a clear transparent area of the sheet at least as large as an image of a facial area, wherein the clear transparent area is shaped in a common facial shape and the viewing sheet is further provided with symbols thereon to indicate the correct facial shape.

7. The invention of claim 6 further comprising an extension of the clear transparent area for viewing a neck area of an image of a user.

8. The invention of claim 1 wherein the clear viewing means of seeing a facial area beneath the hairstyle comprises an opening through the sheet shaped to accommodate an image of one of several common face shapes.

9. The invention of claim 8 further comprising an extension of the opening through the sheet for viewing the neck area of an image of a user.

10. The invention of claim 1 wherein the image of the hairstyle is secured to the flat surface on three edges of the image sheet of the hairstyle and the open fourth edge of the image sheet comprises an open slot for receiving an image of a face of a user.

11. The invention of claim 1 wherein the flat surface comprises one of a series of pages bound together, each page having a different hairstyle image.

12. A method of selecting a desired hairstyle which best matches a user's face and for displaying a mutually scaled picture of the user's face and any of a variety of hairstyles, wherein the method of selecting a desired hairstyle comprises:

photographically producing an image of a hairstyle and printing the image on a sheet having a clear viewing means of a facial area below the outline of the hairstyle, wherein the sheet is mounted on a flat surface such that an open slot exists between the sheet and the flat surface;

photographing a face of a user, by using a scaled facial outline viewing guide having a common facial shape in the viewing system of the photographing means to frame the face of a user through the viewing system to produce a photographically produced image of the user scaled to match the framed hairstyle photograph;

inserting the photographically produced image of the face of the user into the open slot between the hairstyle sheet and the flat surface such that the hairstyle appears to be on the head of the user in the picture.

13. The method of claim 12 wherein the actual hair of the user is pulled away from the face of the user as the user is being photographed.

14. The method of claim 12 further comprising placing a tinted transparent sheet over the hairstyle sheet to change the color and tint of the hairstyle image.

* * * * *